(12) United States Patent
Wolf

(10) Patent No.: US 9,976,821 B2
(45) Date of Patent: May 22, 2018

(54) PIPE CONNECTION, IN PARTICULAR FOR A HEAT EXCHANGER

(71) Applicant: MAHLE Behr GmbH & Co. KG, Stuttgart (DE)

(72) Inventor: Walter Wolf, Oppenweiler-Zell (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 615 days.

(21) Appl. No.: 14/600,334

(22) Filed: Jan. 20, 2015

(65) Prior Publication Data
US 2015/0204621 A1 Jul. 23, 2015

(30) Foreign Application Priority Data

Jan. 20, 2014 (DE) .................. 10 2014 200 906

(51) Int. Cl.
F16L 13/16 (2006.01)
F28F 9/26 (2006.01)
F16L 41/08 (2006.01)
B23P 15/26 (2006.01)
F16L 23/036 (2006.01)
F28F 9/02 (2006.01)

(52) U.S. Cl.
CPC ............. F28F 9/262 (2013.01); B23P 15/26 (2013.01); F16L 13/163 (2013.01); F16L 23/036 (2013.01); F16L 41/082 (2013.01); F28F 9/0256 (2013.01); F28F 9/0258 (2013.01); Y10T 29/4935 (2015.01)

(58) Field of Classification Search
CPC .. F28F 9/262; F28F 9/264; F28F 9/266; F28F 9/0258

USPC ................................. 285/202, 203
See application file for complete search history.

(56) References Cited

U.S. PATENT DOCUMENTS 2,457,105 A 12/1948 Patterson
4,442,586 A 4/1984 Ridenour
4,854,417 A 8/1989 Uesugi et al.
4,902,049 A 2/1990 Umehara
(Continued)

FOREIGN PATENT DOCUMENTS

CN 1313499 A 9/2001
CN 101454604 A 6/2009
(Continued)

OTHER PUBLICATIONS

Extended European Search Report, Appl. No. 15150299.4, dated Jun. 17, 2015, 6 pgs.
(Continued)

Primary Examiner — David Bochna
(74) Attorney, Agent, or Firm — Paul D. Strain, Esq.; Strain & Strain PLLC

(57) ABSTRACT

The application relates to a pipe connection having a pipe end arranged in a connection piece. The pipe connection has an outwardly projecting at least sectionally circumferential bead configured on a pipe end. The connection piece has a radially deformable first connection piece portion creating a first radially deformable connection piece portion. The pipe end is held and secured in the connection piece using the first radially deformable connection piece portion. The application further relates to a heat exchanger with a pipe connection of this kind and a connection method for producing a pipe connection.

11 Claims, 10 Drawing Sheets

(56) References Cited

U.S. PATENT DOCUMENTS

Figure 1:
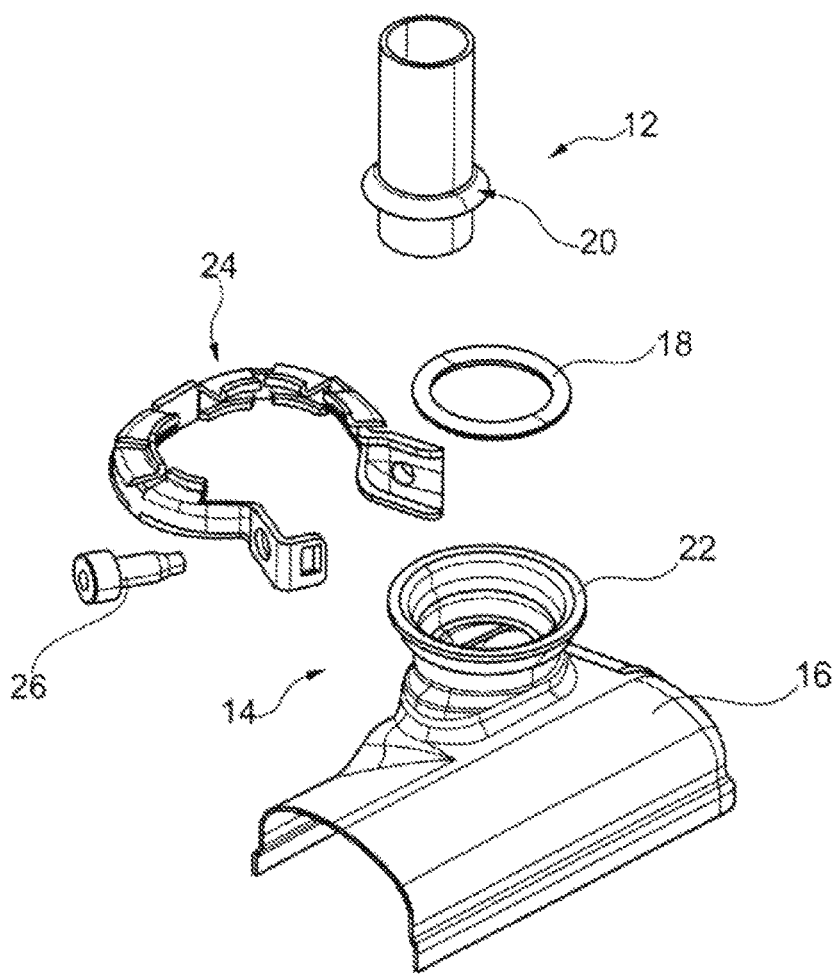
Figure 1:
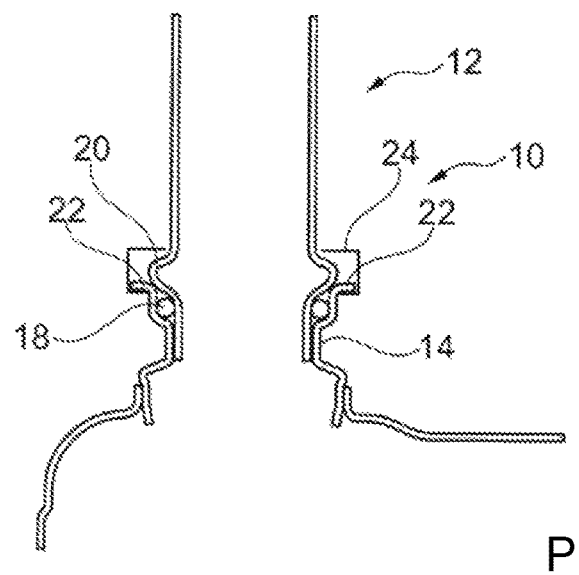

| | | | |
|---|---|---|---|
| 7,188,664 B2 * | 3/2007 | Fuller | F28F 9/0246 |
| | | | 165/140 |
| 7,568,520 B2 * | 8/2009 | Ozawa | F28F 9/0246 |
| | | | 285/203 |
| 2003/0080564 A1 * | 5/2003 | Izumi | F16L 13/163 |
| | | | 285/382 |
| 2003/0234540 A1 | 12/2003 | Igami | |
| 2004/0066039 A1 | 4/2004 | Muhammad et al. | |

FOREIGN PATENT DOCUMENTS

| | | | | |
|---|---|---|---|---|
| DE | 868542 C * | 2/1953 | | F16L 13/163 |
| DE | 198 49 574 A1 | 5/2000 | | |
| DE | 10 2005 030 736 A1 | 1/2007 | | |
| DE | 10 2008 047 003 A1 | 3/2010 | | |
| DE | 10 2009 007 303 A1 | 8/2010 | | |
| DE | 202012006445 U1 * | 10/2013 | | F28F 9/0258 |
| EP | 0412626 A1 * | 2/1991 | | F16L 13/163 |
| EP | 1 479 996 B1 | 11/2004 | | |
| JP | 6-66392 A | 3/1994 | | |
| JP | 2001-27495 A | 1/2001 | | |
| JP | 2005-121171 A | 5/2005 | | |
| WO | WO 00/25080 A1 | 5/2000 | | |
| WO | WO-2010028872 A1 * | 3/2010 | | F16L 13/163 |

OTHER PUBLICATIONS

German Search Report, Appl. No. 10 2014 200 906,5, dated Sep. 19, 2014, 9 pgs.

* cited by examiner

PIPE CONNECTION, IN PARTICULAR FOR A HEAT EXCHANGER

CROSS-REFERENCE TO RELATED PATENT APPLICATIONS

This application is based upon and claims the benefit of priority from prior German Patent Application No. 10 2014 200 906.5, filed Jan. 20, 2014, the entire contents of which are incorporated herein by reference in their entirety.

TECHNICAL FIELD

The invention relates to a pipe connection, in particular for a heat exchanger, according to the preamble of Claim 1. Moreover, the invention relates to a heat exchanger, in particular for a motor vehicle, and a connection method relating to this.

STATE OF THE ART

Heat exchangers are used as radiators, for example in a motor vehicle air-conditioning system. The heat exchanger, in particular the radiator, is equipped with two pipe connections, for example, to which lines of a coolant circuit of the motor vehicle can be connected. In this case, two line connections to the heat exchanger are typically provided. By means of a forward flow connection, warm coolant can reach the radiator; by means of a return flow connection, the cooled coolant can leave the radiator once again. It is important in this case for the line connections to be configured as fluid-tight, in particular coolant-tight, connections, in particular pipe connections.

Pipe/line connections and pipe/pipe connections per se are known in different embodiments.

For example, U.S. Pat. No. 4,854,417 presents a pipe connection to an exhaust silencer. A connection of an inlet pipe to a housing of the exhaust silencer is achieved by introducing a pipe into an opening in the housing, wherein the pipe exhibits a plurality of portions with different diameters which are connected to a portion forming a shoulder. By means of a slight deformation of a housing wall in the region of the opening during the fitting of the inlet pipe, the inlet pipe can be fitted in a properly aligned manner during assembly.

An exhaust manifold with a cylinder flange, manifold pipes and a collector pipe is disclosed in DE 297 22 732 U1. The end of the manifold pipe forms the actual sealing surface. A circumferential groove is worked into the pipe opening of the flange, wherein the manifold pipe is calibrated by means of the groove. In this case, a simple internal tool which spreads the pipe wall at the relevant point is used. The manifold pipe may also exhibit a circumferential nose instead of the groove, which nose can rest on an outer side of the flange.

DE 10 2005 030 736 A1 relates to a line connecting device with a pipe which exhibits at least one flange on an end portion, wherein a tight, pressure-resistant connection is created when at least two flanges lying axially behind one another are provided by a free end of the end portion, wherein the innermost flange on the end portion has a greater circumference than the flange or flanges which are arranged towards the free end.

Representation of the Invention, Problem, Solution, Advantages

The problem addressed by the invention is that of creating an improved pipe connection, in particular for a heat exchanger, and an improved heat exchanger.

This is achieved using a pipe connection, in particular a heat exchanger, having the features of Claim 1.

In an exemplary embodiment of the invention, the pipe connection, in particular for a heat exchanger, exhibits a pipe end arranged in a connection piece, wherein the pipe end has an outwardly projecting, at least sectionally circumferential bead. The connection piece in this case has a first connection piece portion which is radially deformable and creates a first radially deformable connection piece portion, wherein the pipe end is held, as well as fixed and secured, in the connection piece by means of the first radially deformable connection piece portion. The connection piece is preferably assigned to a radiator tank or collector tank of the heat exchanger and is integrally connected or connectable thereto. By means of the pipe end, the heat exchanger can be connected to a line system, preferably to a coolant line system. The first radially deformable connection piece portion is preferably a first flanged or bent connection piece portion. By means of the first radially deformable connection piece portion, the pipe end can be secured in the connection piece and ultimately to the radiator tank. Consequently, a pipe connection is created in which no additional brackets, clips, screw connections or other securing members are needed in order to secure the pipe end in the connection piece. This is advantageous in that it can reduce a variety of parts, in particular a variety of parts that require storage and therefore take up storage capacity. Stock-holding can thereby be optimized and costs involved in producing the heat exchanger ultimately saved. Moreover, less radial installation space is required for the pipe connection, as the additional clips and screws filling space in the radial direction are omitted.

The first radially deformable connection piece portion exhibits an annular region in this case which forms an annular segment with a first circle segment and a second circle segment. The first connection piece portion may enclose the pipe end circumferentially in this case. The annular region is preferably open on one side, wherein the pipe end projects beyond the annular region.

The first radially deformable connection piece portion preferably forms a cylindrical surface surrounding the pipe end with radially deformable regions. The cylindrical surface in this case may be a closed cylindrical surface. Alternatively, the cylindrical surface may exhibit interrupted cylindrical surface portions.

The cylindrical surface preferably exhibits radially arranged circle segments and radially arranged beads. Consequently, undulating flanging is formed on the first connection piece portion. The undulating flanging may be created by forming the cylindrical surface sectionally about an axis parallel to a pipe axis.

Alternatively, the cylindrical surface may exhibit segments sectionally and material-free intermediate spaces arranged between the segments. This may preferably have been created by bend flanging, wherein a bend is preferably made about an axis parallel to the pipe axis.

A further embodiment of the pipe connection is characterized in that the cylindrical surface has a U-shaped configuration, wherein the legs of the "U" form second cylindrical surface portions on a first cylindrical surface portion configured substantially parallel to a z-axis, which second cylindrical surface portions are perpendicular to said first cylindrical surface portion on both sides and are adjoining and circumferential. The U-shaped cylindrical surface in this case has preferably been created by bend flanging with a bend about an axis perpendicular to the axis of the pipe end.

The flange shapes (segments and circle segments) are preferably distributed around the circumference of the first radially deformed connection piece portion. Particularly preferably, these are distributed in a 2, 3, 4, 5, 6-fold design. These are advantageously distributed in fours, in other words offset at 90° around a circumference of the pipe end.

The connection piece preferably exhibits a second connection piece portion which is configured integrally with the first connection piece portion. The second connection piece portion is preferably configured on the radiator tank of the heat exchanger. The second connection piece portion is preferably conically formed in this case, wherein the cone may exhibit changes in diameter. The second connection piece portion in this case may exhibit portions with a different pitch. A shoulder or a bearing surface is preferably configured between the first and the second connection piece portion, against which the outwardly projecting bead can rest. By means of the bearing surface, the pipe end can be fixed in its longitudinal position along the pipe axis. By means of the radially deformed portions of the connection piece, the pipe end can be fixed on a plane perpendicular to the pipe extension direction (x-y plane).

A fluid-tight pipe connection may be realized by arranging a sealing member between the pipe end and the connection piece. The sealing member in this case may be a flexible rubber sealing member, for example an O-ring. The sealing member is preferably arranged between the cylindrical surface of the first connection piece portion and the pipe end, in particular a wall of the outwardly projecting bead.

The problem is likewise solved by a heat exchanger having a pipe connection according to the invention. The heat exchanger in this case may be arranged in a motor vehicle and be or become connected to the coolant system of the motor vehicle. The pipe connection in this case is arranged between the radiator tank of the heat exchanger and the coolant line system. The heat exchanger may exhibit a first pipe connection according to the invention at the inlet and a second pipe connection at the outlet. By means of the pipe connections, a secure, in particular fluid-tight, preferably coolant-tight, connection of the heat exchanger to, for example, the coolant line system and therefore to the coolant circuit can be realized. Neither cold nor warm coolant can escape at the connection point. It is therefore guaranteed that no vehicle parts in the engine block are destroyed by hot coolant. The safety of passengers in the vehicle can thereby also be guaranteed.

The problem is also solved by a connection method in which the following steps are envisaged in order to connect a radiator tank of a heat exchanger to a pipe end of a line system, for example a coolant line system:
  arrangement of the pipe end in the connection piece,
  positioning of a first tool at the first connection piece portion,
  forming of the first connection piece portion by means of the first tool or a second tool suitable for forming the first connection piece portion.

Forming preferably takes place by bending about an axis parallel to the pipe axis, wherein undulating flanging or bend flanging is produced. In this case, the undulating flanging exhibits radially deformed regions.

In an embodiment of the connecting method, forming takes place by bending about an axis perpendicular to the pipe axis, wherein bend flanging is produced.

By means of the connecting method according to the invention, a secure, fixed pipe connection can be produced. By arranging a sealing member between the first connection piece portion and the pipe end, the pipe connection can be fluid-tight, in particular coolant-tight.

Further advantageous embodiments are described by the following description of the figures and by the dependent claims.

BRIEF DESCRIPTION OF THE FIGURES IN THE DRAWING

Figure 2:
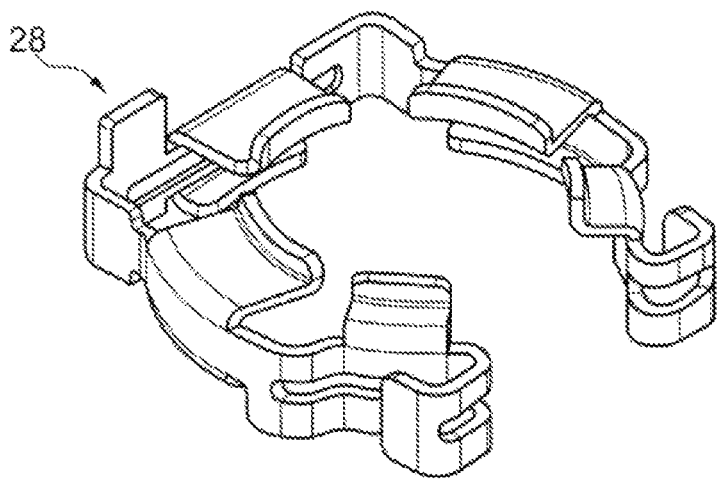
Figure 2:
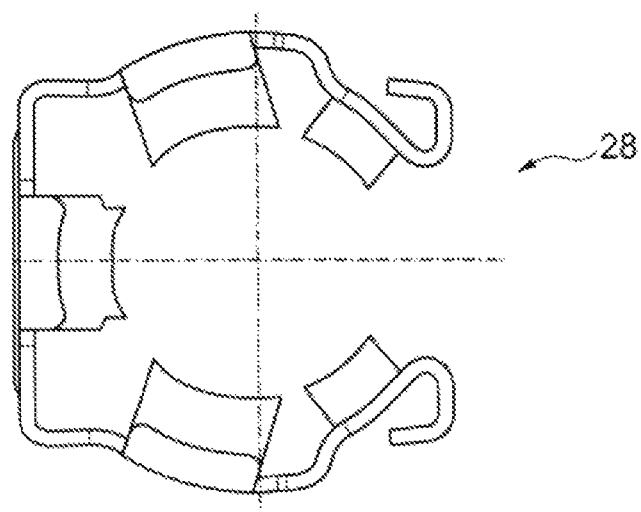
Figure 3:
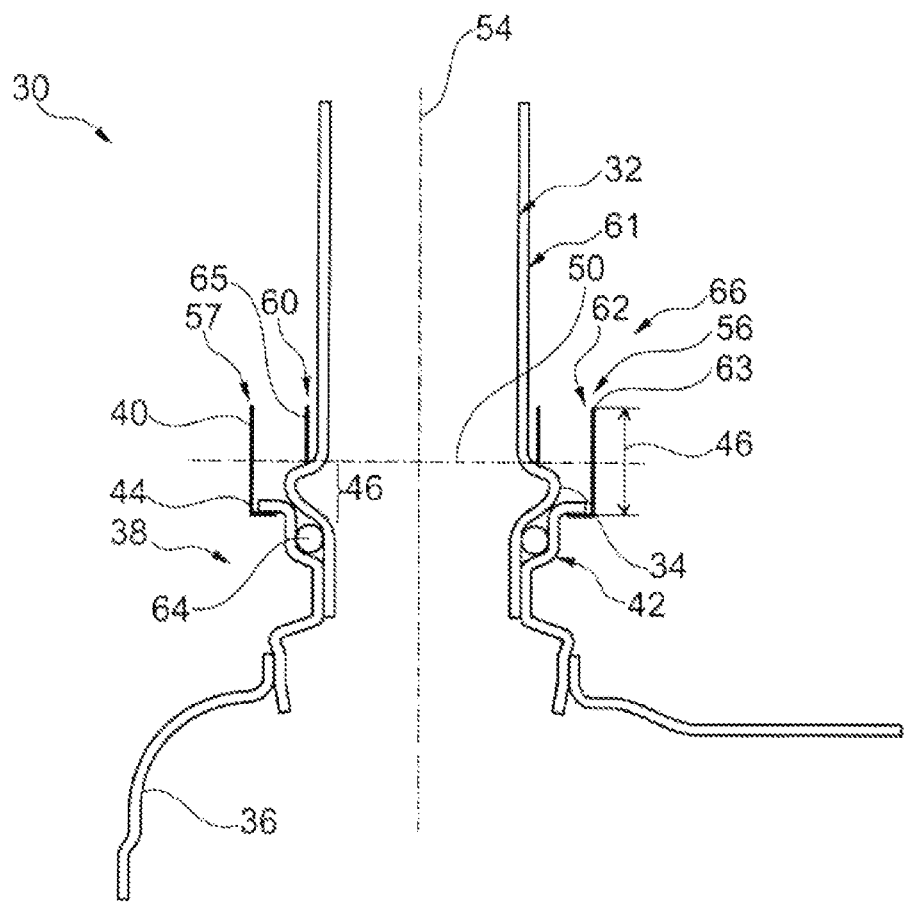
Figure 4:
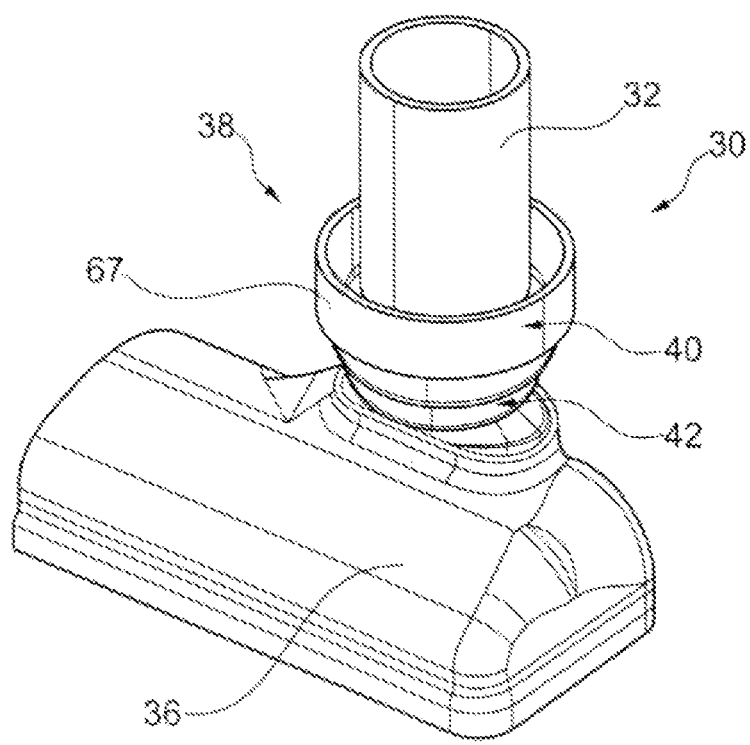
Figure 5:
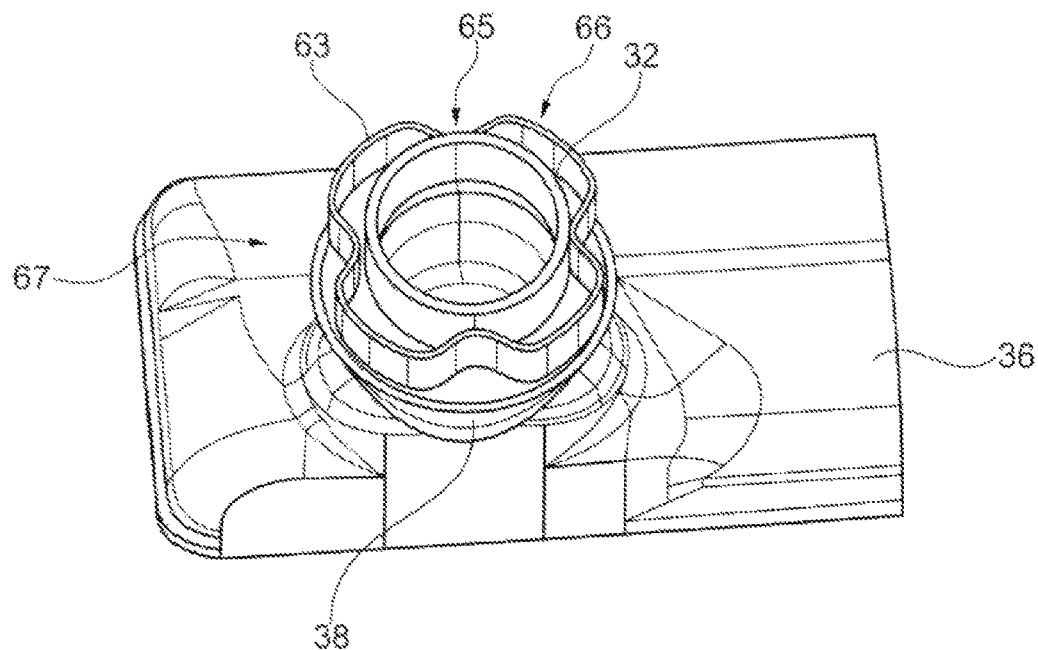
Figure 6:
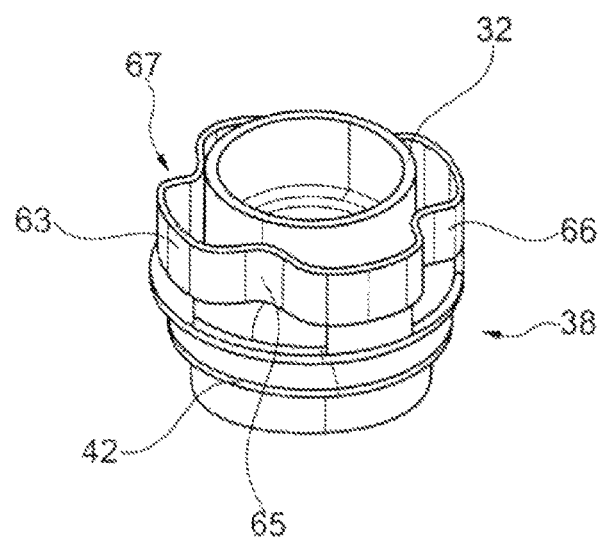
Figure 7:
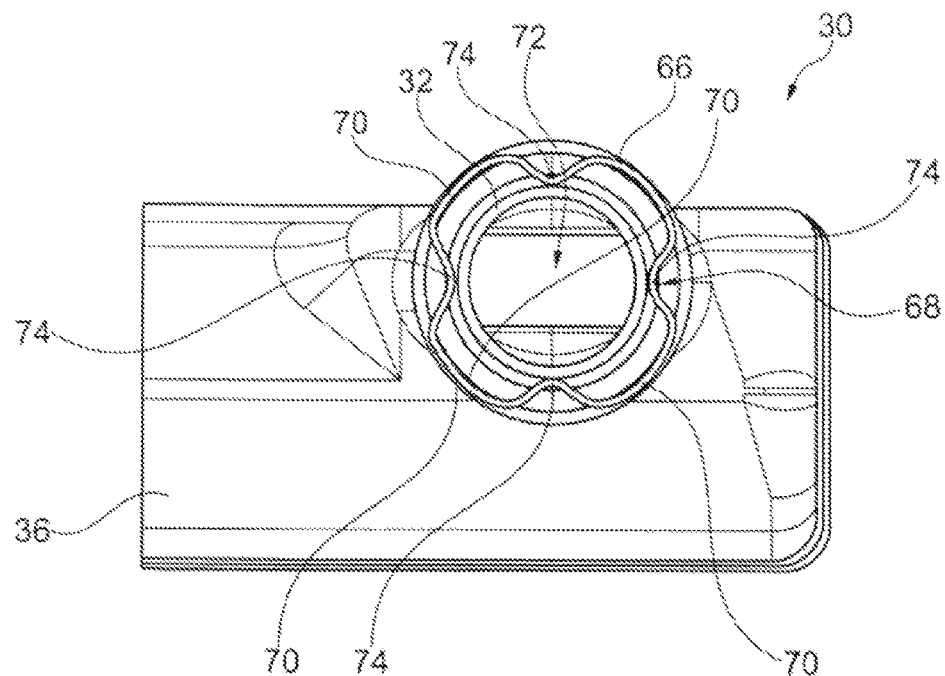
Figure 8:
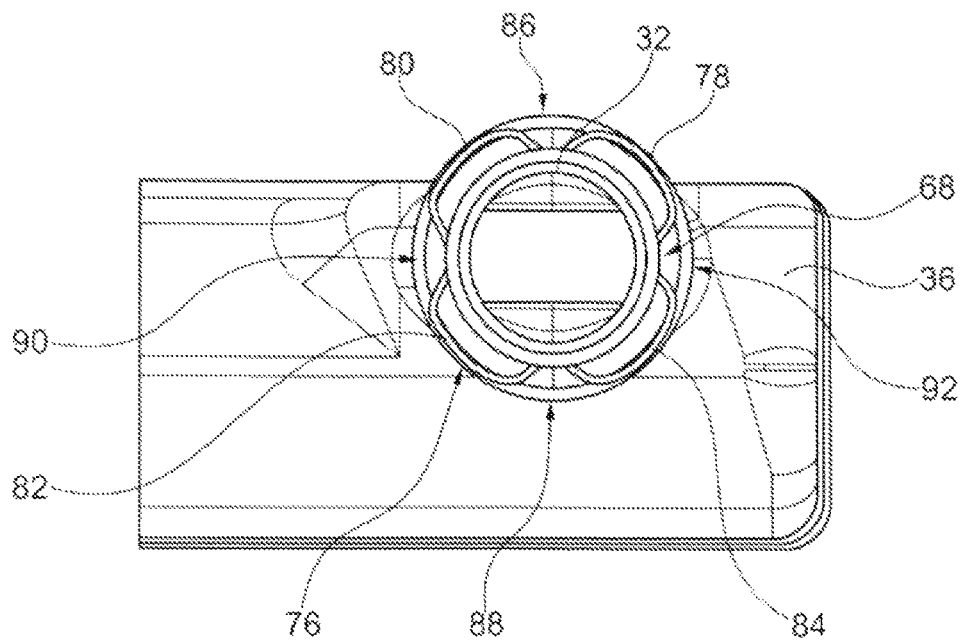
Figure 9:
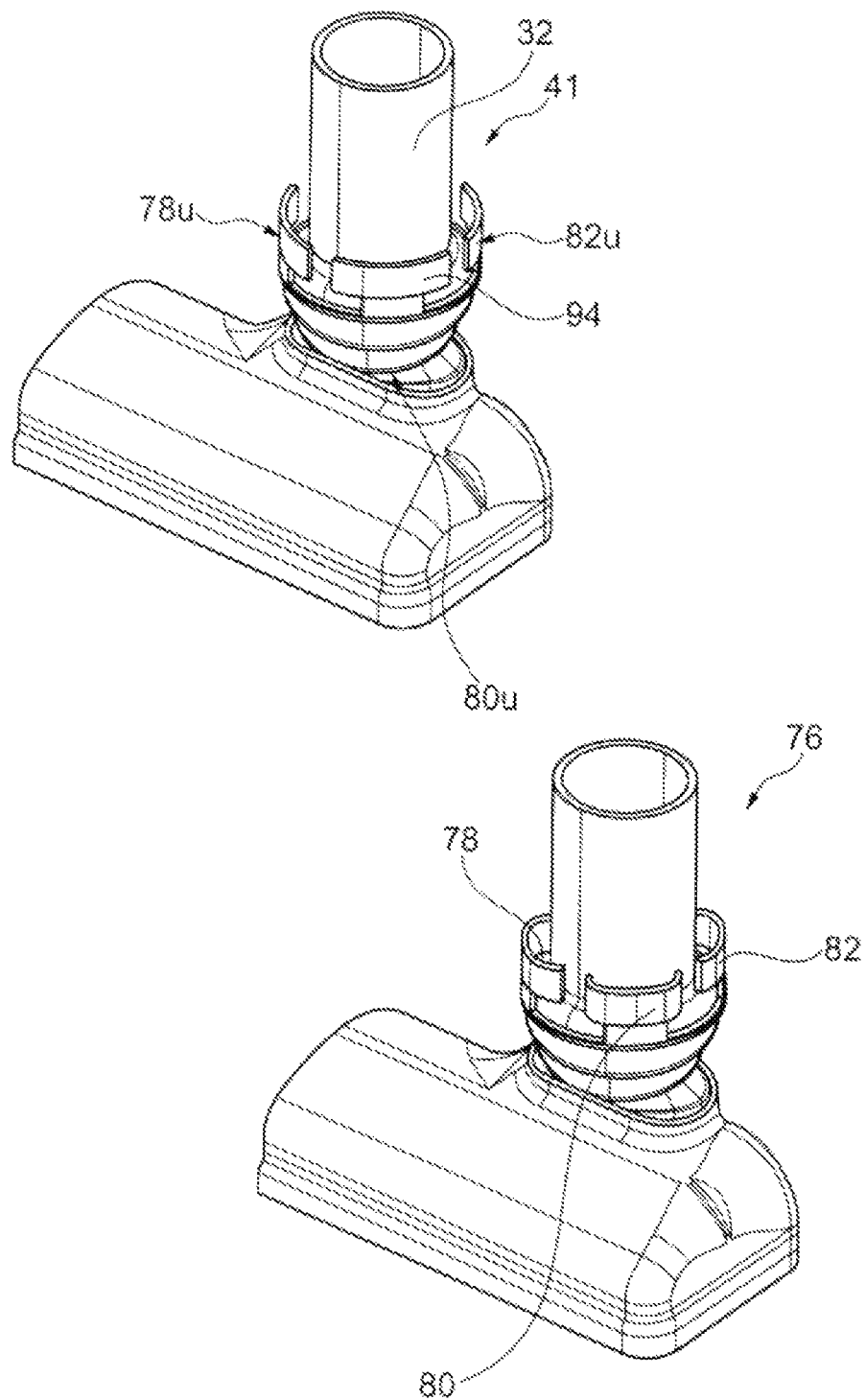
Figure 10:
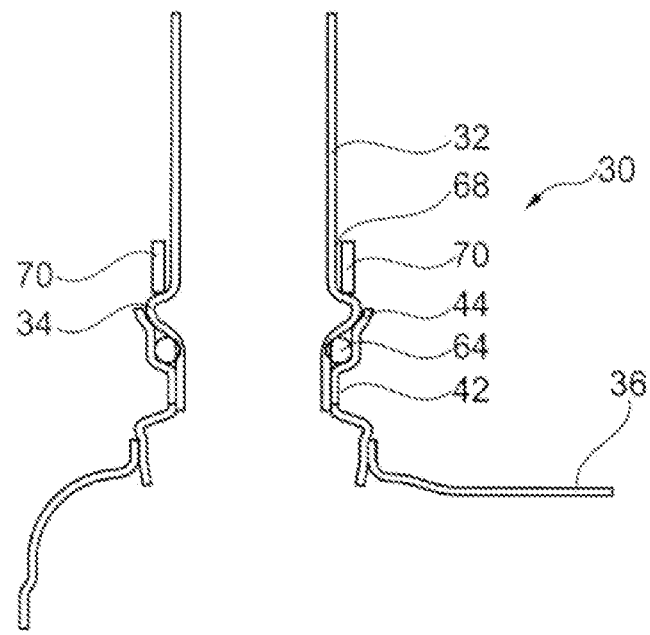
Figure 11:
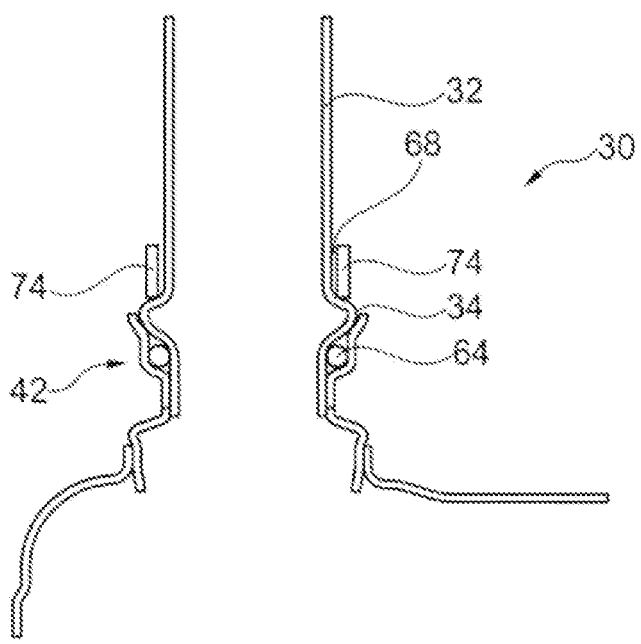
Figure 12:
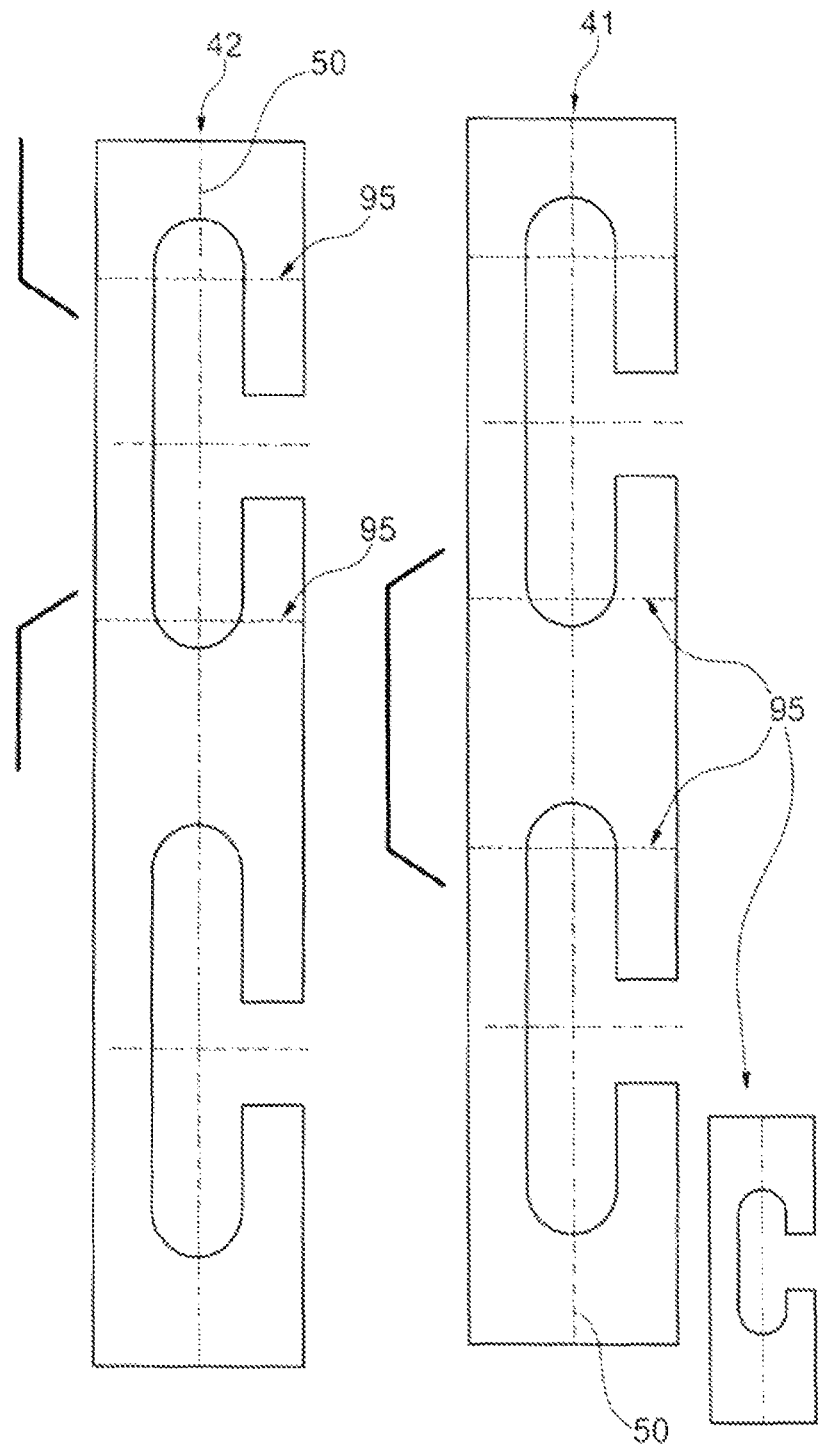
Figure 13:
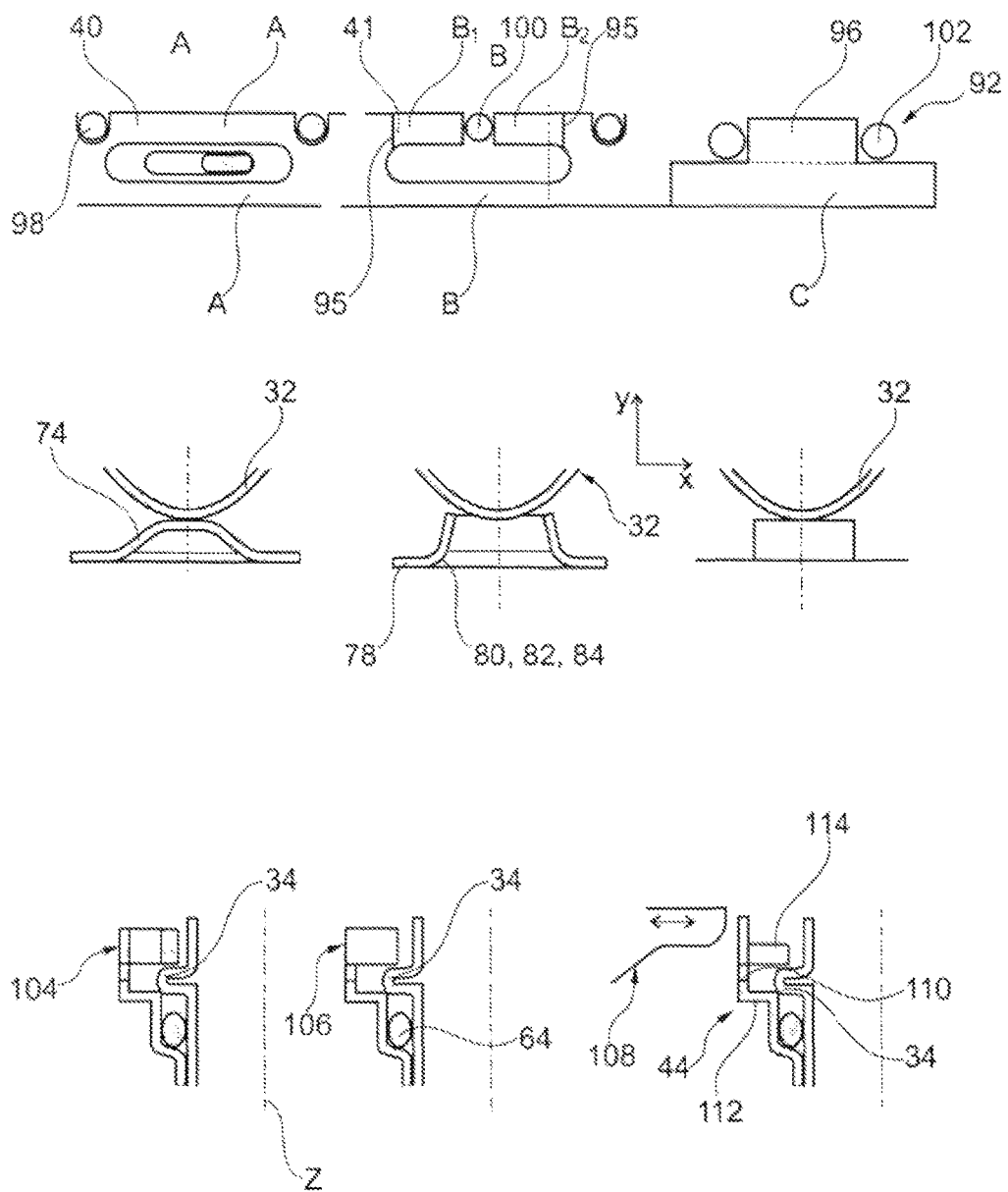

The invention is explained in greater detail below based on at least one exemplary embodiment with the help of the figures in the drawing. In the figures:

FIG. 1 shows a pipe connection for a heat exchanger according to the state of the art as a perspective representation and as a sectional view, FIG. 2 shows a connection clip for fixing a pipe end to a connection piece according to the state of the art as a perspective representation and as a plan view, FIG. 3 shows a schematic sectional representation of a pipe connection according to a first exemplary embodiment of the invention, FIG. 4 shows a perspective view of a first connection piece portion prior to forming for a pipe connection according to the invention, FIG. 5 shows a perspective view of the pipe connection with a first radially deformed connection piece portion according to the invention, FIG. 6 shows a further perspective view of the pipe connection with the first radially deformed connection piece portion according to the invention, FIG. 7 shows a schematic representation of the pipe connection in FIG. 5 as a plan view, FIG. 8 shows a schematic representation of a pipe connection in a further exemplary embodiment according to the invention as a plan view, FIG. 9 shows the pipe connection from FIG. 8 prior to forming (left) and after forming (right) as a perspective view, FIG. 10 shows a first region of the first radially deformed connection piece portion of the pipe connection in FIGS. 5 and 6 as a sectional view, FIG. 11 shows a second region of the first radially deformed connection piece, FIG. 12 shows a sectional view of a detail of the first connection piece portion according to the second embodiment, FIG. 13 shows a schematic representation of the connecting process for different embodiments of the pipe connection according to the invention.

PREFERRED EMBODIMENT OF THE INVENTION

FIG. 1 shows as a schematic view a pipe connection 10 according to the state of the art. In the lower portion of FIG. 1, the pipe connection is shown as a sectional view. In the upper part of FIG. 1, the individual members of the pipe connection 10 are shown as a perspective view. By means of the pipe connection 10, a pipe end 12 is connected to a connection piece 14 of a radiator tank 16 of a heat exchanger which is not depicted. A sealing member 18 is arranged between the connection piece 14 and the pipe end 12, by means of which sealing member a fluid-tight connection can be produced or is realized. The pipe end has a circumferential and outwardly projecting bead 20. The pipe end 12 is pushed into the connection piece 14 as far as the bead 20 and bears against a circumferential shoulder 22 of the connection piece 14. The pipe end 12 is fixed to the connection piece 14 by means of a clip 24. The clip 24 is closed by a screw 26. The pipe end 12 is thereby secured using a firmly screwed and closed clip 24 on the and in the connection piece 14.

FIG. 2 shows a clip 28 according to the state of the art as a perspective view (upper part of the figure) and as a plan view in an x-y direction (lower part of the figure) as an alternative fastening possibility of the pipe end 12 to the connection piece 14 according to the state of the art. The clip 28 is pushed over the connection piece 14 during the assembly process.

FIG. 3 shows a pipe connection 30 as a sectional view according to the invention. The pipe connection 30 has a pipe end 32 with a molded, outwardly projecting and circumferential bead 34. A connection piece 38 arranged on a radiator tank 36 of a heat exchanger which is not shown exhibits a first connection piece portion 40. The connection piece 38 exhibits a formed second connection piece portion 42, which is formed such that it has a connection piece shoulder 44, against which the bead 34 can rest in the assembled state of the pipe connection 30. The first connection piece portion 40 and the second connection piece portion 42 are preferably configured integrally. The first connection piece portion 40 is preferably cylindrically configured and exhibits a cylinder height 46. The cylinder height 46 extends in the assembled state in which the pipe end 32 is inserted into the connection piece 38, preferably from the connection piece shoulder 44 over an extension region 48 of the bead 34 and surrounds the pipe end 32 by at least a few millimeters.

An intersection line 50 depicts an x-y plane which is formed perpendicularly to the axis 54 of the pipe end 32. The connection piece shoulder 44 is configured in a plane parallel to the x-y plane. In the left half of the pipe connection 30 shown in FIG. 3, the first connection piece portion 40 of the pipe end 32 is shown in the connection piece 38 and therefore prior to a forming to be applied to the connection piece portion 40. In the right half, the first connection piece portion 40 is shown after the forming of the annular segment 56. The formed connection piece portion is indicated using the reference number 66. The connection depicted on the left has no free punch, the one shown on the right has a free punch for smaller forming forces. Forming is performed by means of a suitable tool which forms the first connection piece portion 40 above the line 50 and has produced an annular segment 56. The annular segment 56 is formed sectionally in the forming process from the starting position 57 into an end position 60 at which it bears circumferentially against the pipe end 32 in sections. The position at and immediately adjacent to an outer pipe circumference 58 is indicated using reference number 60. The connection piece portion 66 has first circle segments 63 with a first radius and second circle segments 65 arranged therebetween with a second radius r2. The first radius r1 in this case roughly corresponds to that of the first connection piece portion 40. The second radius r2 is smaller than the first radius r1. The first connection piece portion 40 has been radially deformed by the forming process and undulating flanging with the first and second circle segments 63 and 65 has resulted.

A sealing member 64, for example an O-ring, is arranged between an outer pipe circumference surface 61 and a connection piece inner surface 62. The forms of the connection piece 38 may be differently configured on the x-y plane. For example, they may be round or oval.

FIG. 4 shows the pipe connection 30 as a perspective view, wherein the pipe end 32 is not yet fixed and secured in the connection piece 38. Identical parts are indicated using the same reference numbers. The radiator tank 36 has the connection piece 38 with the first connection piece portion 40 and the second connection piece portion 42. The pipe end 32 is inserted into the connection piece 38 and extends beyond the first connection piece portion 40. The first connection piece portion 40 is arranged annularly about the pipe end 32 and spaced apart therefrom. The annular segment 56 forms a cylindrical surface 67. The cylindrical surface 67 is preferably continuously formed.

FIG. 5 shows a perspective view of the pipe connection 30 diagonally from above. The connection piece portion 40 has been formed and has created the radially deformed connection piece portion 66. The connection piece portion 66 is arranged radially symmetrically about the pipe end 32. The same parts are indicated using the same reference numbers. The connection piece portion 66 exhibits the first circle segment 63 and the second circle segment 65. The circle segments 63 and 65 form the cylindrical surface 67. The cylindrical surface 67 is integrally formed and represents a continuous strip.

FIG. 6 shows the connection piece 38 in perspective view with the formed connection piece portion 66 and the second connection piece portion 42, both of which are arranged radially symmetrically about the pipe end 32. Identical parts are indicated using the same reference numbers. Between 42 and 66, regions can be freely punched on the circumferential side.

FIG. 7 shows the pipe connection 30 as a plan view with the direction of view along the z-axis 54. Identical parts are indicated using the same reference numbers. The formed connection piece portion 66 surrounds the pipe end 32 centrically. The connection piece portion 66 is annularly and integrally configured. In particular, the connection piece portion 66 is integrally configured with the second connection piece portion 42. The connection piece portion 66 has four ring segments 70 distributed uniformly over a circumference 68, which ring segments have a diameter 20 which corresponds to the connection piece portion 40 and four bead-shaped ring segments 74, wherein ring segments 70 and ring segments 74 are distributed alternately over the circumference 68. The ring segments 70 and 74 are formed from the cylindrical surface 67.

FIG. 8 shows a further exemplary embodiment of a connection piece portion 41 after this has been deformed or formed. The deformed or formed connection piece portion is indicated using the reference number 76. The connection piece portion 76 exhibits four separate segments 78, 80, 82 and 84 which are preferably of the same size and distributed uniformly around the circumference 68 of the pipe end 32. An intermediate space 86, 88, 90 and 92 is arranged between each of the segments 78, 80, 82 and 84. The intermediate spaces 86, 88, 90 and 92 are the same size, so that the segments 78, 80, 82 and 84 are evenly spaced out radially. The segments 78, 80, 82 and 84 are each bent inwards at both ends in the direction of the z-axis 54. In this case, the end of the segment 78, 80, 82 and 84 in each case is directly adjacent to the outer circumference surface 68 of the pipe end 32.

FIG. 9 shows the embodiment of the pipe connection 30 in FIG. 8 as a perspective view. In the right part of FIG. 9, segments 78$u$, 84$u$, 82$u$ and 84$u$ (not visible) (the suffix u denotes non-deformed segments) are not yet deformed and create the connection piece portion 41. Segments 78$u$, 80$u$, 82$u$ and 84$u$ are spaced apart from the outer circumference surface 68 of the pipe end 32. The connection piece portion 41 is a modification of the first connection piece portion 40.

A circle segment surface 94 runs substantially parallel to the pipe end 32. In the right partial image in FIG. 9, the connection piece portion 41 is deformed and has segments 78, 80, 82 and 84 which have bent ends in the direction of the pipe end 3, are non-deformed or awaiting forming.

FIG. 10 shows the pipe connection 30 as a sectional view on a sectional plane running along the z-axis and through two ring segments 70 lying opposite one another. The ring segment 70 in each case is spaced apart from the pipe end 32, in particular spaced apart from the outer diameter 68 of the pipe end 32.

FIG. 11 shows the pipe connection 30 on a sectional plane parallel to the z-axis and on a plane formed by two bead-shaped portions 74 arranged opposite. The bead-shaped portions 74 lie closer to the outer circumference surface 68 of the pipe end 32, are in particular arranged immediately adjacent to the pipe end 32.

FIG. 12 shows the second embodiment of the first connection piece portion 41 in unrolled form, before it is bent into an annular connection piece portion 41. Bending edges 95 depicted by dotted lines can be seen. The bending edges 95 may be realized by a common stamp which is not shown. The connection piece portion 41 depicted in the left half of FIG. 12 and the connection piece portion depicted in the right half of FIG. 12 shows two different possible positions for the bending edges 95.

FIG. 13 shows three of the possible embodiments for the first non-deformed connection piece portion 40, 41 and 96. The embodiment referred to as A is the embodiment shown in FIGS. 3, 4, 5, 6, 7 which starts from the connection piece portion 40 in the non-deformed state. The embodiment denoted B is the embodiment of the first connection piece portion 41 in the non-deformed state depicted in FIGS. 8, 9, 10, 11 and 12. The embodiment denoted C is shown for the first time in FIG. 13 and the first connection piece portion of this embodiment is referred to using the reference number 96. Using the circular symbols 98, a position for a first tool or a positional tool 98, 100 and 102 for the three embodiments is denoted. In the middle row in FIG. 13, the pipe end 32 and the first connection piece portion 40, 41 and 96 for the respective embodiments are depicted in a sectional representation on the x-y plane. The bottom row shows for each of the three embodiments an associated tool 104, 106, 108 as a sectional view parallel to the z-axis.

The third embodiment 96 of the first connection piece portion 96 corresponds to the first connection piece portion 40 and exhibits an L-shape 110 following deformation. In this case, the bead 34 is virtually enclosed from above and radially by the first connection piece portion 96 and formed in the direction of the bead 34 by the connection portion piece 44. Consequently, the L 110 exhibits parts of both the first connection piece portion 96 and also the second connection piece portion 42. The connection piece portion 40 is bent over, so that two segments 112 and 114 are each arranged substantially parallel to one another, wherein the shorter segment 112 can also be bent upwards, so that it can exhibit a portion parallel to the segment 114, at least sectionally. The segment 112 exhibits the shoulder 44 at least sectionally in this case.

The invention claimed is:

1. A pipe connection comprising a pipe having a pipe end arranged in a connection piece, wherein an outwardly projecting, at least sectionally circumferential bead is configured on the pipe end, wherein the connection piece has a first connection piece portion which is radially deformable and creates a first radially deformable connection piece portion, wherein the pipe end is held and secured substantially immovably in the connection piece by the first radially deformable connection piece portion, wherein the first radially deformable connection piece portion forms a cylindrical surface surrounding the pipe end with radially deformable regions, wherein the cylindrical surface exhibits segments and material-free intermediate spaces arranged between the segments, wherein each segment has a U-shaped configuration, wherein the legs of the "U" form two second cylindrical surface portions connected by a first cylindrical surface portion, wherein the second cylindrical surface portions are substantially perpendicular to the first cylindrical surface portion.

2. The pipe connection according to claim 1, wherein the first radially deformable connection piece portion is configured annularly and forms an annular segment with a first circle segment and a second circle segment.

3. The pipe connection according to claim 1, wherein the cylindrical surface exhibits radially arranged circle segments and radially arranged and inwardly projecting beads.

4. The pipe connection according to claim 1, wherein a sealing member is arranged between the pipe end and the connection piece.

5. The pipe connection according to claim 1, wherein a second connection piece portion is provided which is integrally formed with the first connection piece portion.

6. A heat exchanger having a radiator tank with a connection piece and a pipe end for connecting the heat exchanger to a coolant line system, wherein at least one pipe connection according to claim 5 is provided wherein the pipe end is held and secured to the radiator tank by means of the first radially deformable connection piece portion of the pipe connection.

7. The heat exchanger according to claim 6, wherein the second connection piece portion is arranged between the first connection piece portion and the radiator tank.

8. The heat exchanger according to claim 7, wherein the second connection piece is configured integrally with the radiator tank.

9. A connection method for connecting a radiator tank of a heat exchanger to a pipe end of a line system, the method comprising:
arrangement of a pipe having the pipe end according to claim 1 in the connection piece,
positioning of a first tool at the first connection piece portion,
forming of the first connection piece portion by using the first tool or a second tool suitable for forming the first connection piece portion.

10. The connection method according to claim 9, wherein forming is bending about an axis parallel to the pipe axis, wherein undulating flanging or bend flanging is produced.

11. The connection method according to claim 9, wherein forming is bending about an axis perpendicular to the pipe axis, wherein bend flanging is produced.

* * * * *